US011242472B2

(12) United States Patent
Shirakawa et al.

(10) Patent No.: US 11,242,472 B2
(45) Date of Patent: Feb. 8, 2022

(54) ADHESIVE FILM

(71) Applicant: HITACHI CHEMICAL COMPANY, LTD., Tokyo (JP)

(72) Inventors: Tetsuyuki Shirakawa, Tokyo (JP); Hiroyuki Izawa, Tokyo (JP); Takahiro Fukui, Tokyo (JP); Tatsuya Kumada, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 245 days.

(21) Appl. No.: 16/486,522

(22) PCT Filed: Feb. 14, 2018

(86) PCT No.: PCT/JP2018/005012
§ 371 (c)(1),
(2) Date: Aug. 16, 2019

(87) PCT Pub. No.: WO2018/151131
PCT Pub. Date: Aug. 23, 2018

(65) Prior Publication Data
US 2019/0367782 A1 Dec. 5, 2019

(30) Foreign Application Priority Data

Feb. 17, 2017 (JP) .............................. JP2017-027983
Feb. 17, 2017 (JP) .............................. JP2017-027985

(51) Int. Cl.
*C09J 9/02* (2006.01)
*C08K 3/08* (2006.01)
(Continued)

(52) U.S. Cl.
CPC ................. *C09J 9/02* (2013.01); *C08K 3/08* (2013.01); *C09J 11/04* (2013.01); *C09J 201/00* (2013.01);
(Continued)

(58) Field of Classification Search
CPC ...... C08K 2003/0831; C08K 2003/085; C08K 2003/0862; C08K 2201/001; C08K 3/08;
(Continued)

(56) References Cited

U.S. PATENT DOCUMENTS

2010/0313667 A1* 12/2010 Terada ................. G01R 1/0735
73/754
2018/0346766 A1* 12/2018 Mihara ...................... C09J 7/10
2019/0016928 A1* 1/2019 Mihara .................... C09J 11/02

FOREIGN PATENT DOCUMENTS

JP S64-059786 A 3/1989
JP 2002-324427 A 11/2002
(Continued)

*Primary Examiner* — Mark Kopec
*Assistant Examiner* — Jaison P Thomas
(74) *Attorney, Agent, or Firm* — Fitch, Even, Tabin & Flannery, LLP (57) ABSTRACT

One aspect of the present invention is an adhesive film comprising a first adhesive layer comprising a first conductive particle that is a dendritic conductive particle; and a second adhesive layer containing a second conductive particle that is a conductive particle other than the first conductive particle, the second conductive particle comprising a nonconductive core body and a conductive layer provided on the core body.

11 Claims, 6 Drawing Sheets

(51) Int. Cl.
*C09J 11/04* (2006.01)
*C09J 201/00* (2006.01)

(52) U.S. Cl.
CPC .............. *C08K 2003/0831* (2013.01); *C08K 2003/0862* (2013.01); *C08K 2201/001* (2013.01); *C09J 2203/326* (2013.01)

(58) Field of Classification Search
CPC . C08K 9/02; C09J 11/04; C09J 201/00; C09J 2203/318; C09J 2203/326; C09J 2301/208; C09J 2301/314; C09J 2400/16; C09J 7/10; C09J 9/02; H01R 11/01
See application file for complete search history.

(56) References Cited

FOREIGN PATENT DOCUMENTS

| | | | | |
|---|---|---|---|---|
| JP | 2003-045229 A | | 2/2003 | |
| JP | 2014110263 A | * | 6/2014 | ........... H01L 23/293 |
| WO | 2014/021037 A1 | | 2/2014 | |

\* cited by examiner

ADHESIVE FILM

CROSS-REFERENCE TO RELATED APPLICATIONS

This application is a U.S. national phase application filed under 35 U.S.C. § 371 of International Application No. PCT/JP2018/005012, filed Feb. 14, 2018, designating the United States, which claims priority from Japanese Patent Application No. 2017-027983, filed Feb. 17, 2017, and Japanese Patent Application No. 2017-027985, filed Feb. 17, 2017, which are hereby incorporated herein by reference in their entirety.

TECHNICAL FIELD

The present invention relates to an adhesive film.

BACKGROUND ART

In recent years, various adhesives have been used in the fields of semiconductors, liquid crystal displays, and the like for fixing electronic components, connecting circuits, and the like. In these applications, higher integration density and higher fineness of electronic components, circuits, and the like are progressed, and adhesives are required to have a higher level of performance.

An adhesive having conductive particles dispersed in the adhesive has been used in, for example, connection between a liquid crystal display and a TCP (Tape Carrier Package), connection between an FPC (Flexible Printed Circuit) and a TCP, or connection between an FPC and a printed wiring board. Such an adhesive is required to further enhance the conductivity and reliability.

For example, Patent Literature 1 describes a conductive film comprising a conductive layer containing predetermined silver-coated dendritic copper powder particles on a substrate film, and discloses that such a conductive film can provide sufficient conductive properties without including a silver powder.

CITATION LIST

Patent Literature

Patent Literature 1: International Publication No. WO 2014/021037

SUMMARY OF INVENTION

Technical Problem

The object of the present invention is to provide an adhesive film having excellent reliability.

Solution to Problem

One aspect of the present invention is an adhesive film comprising a first adhesive layer containing a first conductive particle that is a dendritic conductive particle; and a second adhesive layer containing a second conductive particle that is a conductive particle other than the first conductive particle, the second conductive particle having a nonconductive core body and a conductive layer provided on the core body.

The first adhesive layer may further contain the second conductive particle. In this case, the volume proportion of the second conductive particle in the first adhesive layer may be smaller than the volume proportion of the second conductive particle in the second adhesive layer. The first adhesive layer may not contain the second conductive particle.

The adhesive film, in another aspect, comprises the above first adhesive layer, the above second adhesive layer, and a third adhesive layer in this order, and may be an adhesive film with the third adhesive layer containing a third conductive particle that is a dendritic conductive particle.

The third adhesive layer may further contain the second conductive particle. In this case, the volume proportion of the second conductive particle in the third adhesive layer may be smaller than the volume proportion of the second conductive particle in the second adhesive layer. The third adhesive layer may not contain the second conductive particle.

The conductive layer may contain at least one selected from the group consisting of gold, nickel, and palladium.

Advantageous Effects of Invention

The present invention can provide an adhesive film having excellent reliability.

DESCRIPTION OF EMBODIMENTS

Hereinafter, embodiments of the present invention will be described in detail with reference to the drawings as appropriate.

Figure 1:
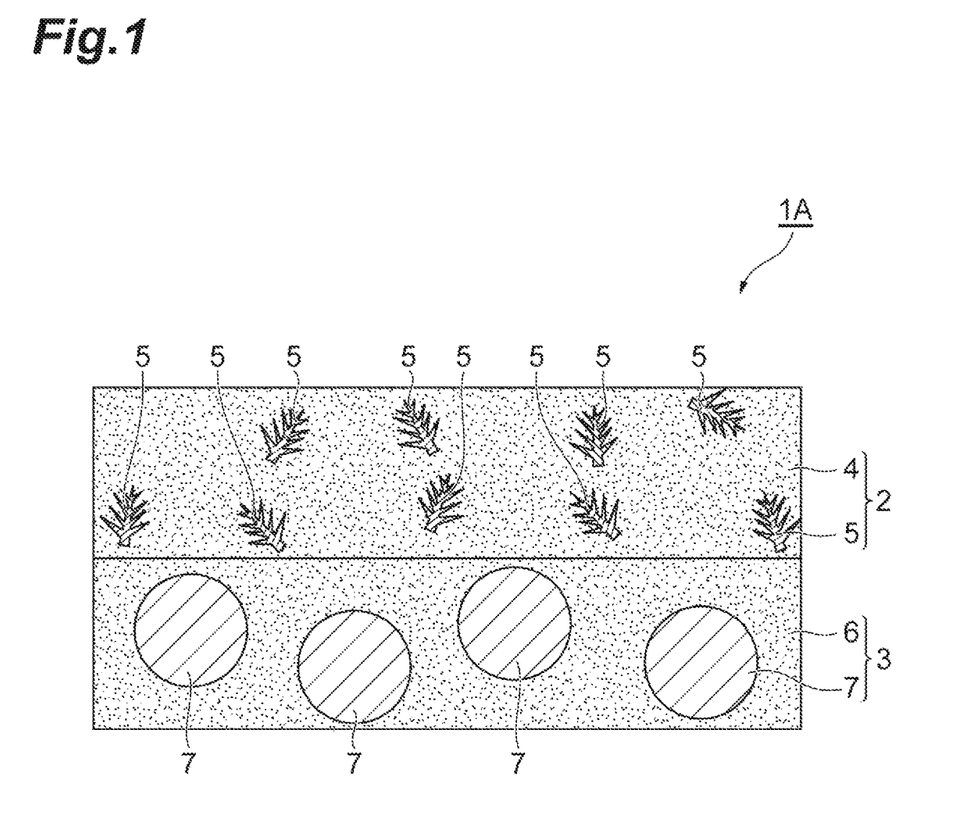
FIG. 1 is a schematic cross-sectional diagram showing one embodiment of an adhesive film.

FIG. 1 is a schematic cross-sectional diagram showing one embodiment (the first embodiment) of the adhesive film. As shown in FIG. 1, the adhesive film 1A according to the first embodiment comprises a first adhesive layer 2 and a second adhesive layer 3 provided on one surface of the first adhesive layer 2. The first adhesive layer 2 contains a first adhesive component 4 and a first conductive particle 5 dispersed in the first adhesive component 4. The second adhesive layer 3 contains a second adhesive component 6 and a second conductive particle 7 dispersed in the second adhesive component 6.

The first adhesive component 4 and the second adhesive component 6 may be the same or different from each other, and preferably are the same, from the viewpoint of obtaining stable adhesive strength against a change in ambient temperature. The first adhesive component 4 and the second adhesive component 6 may each be an adhesive component as described below.

The adhesive component is composed of, for example, a material exhibiting curability by heat or light, and may be an epoxy type adhesive, a radically curable adhesive, and a thermoplastic adhesive such as polyurethane and polyvinyl ester. Since the adhesive component is excellent in heat resistance and moisture resistance after adhesion, the adhesive component may be composed of a crosslinkable material. Of these adhesives, the epoxy type adhesive containing an epoxy resin which is a thermosetting resin as a main component is preferably used from the viewpoint that the epoxy type adhesive can be cured in a short time, has good connection workability, is excellent in adhesiveness, and the like. The radically curable adhesive has properties such as being excellent in curability at a low temperature in a short time as compared with the epoxy type adhesive, and is therefore suitably used according to the application.

The epoxy type adhesive contains, for example, a thermosetting material such as an epoxy resin and a curing agent, and may further contain a thermoplastic resin, a coupling agent, a filler, and the like as necessary.

Examples of the epoxy resin include a bisphenol A type epoxy resin, a bisphenol F type epoxy resin, a bisphenol S type epoxy resin, a phenol novolak type epoxy resin, a cresol novolak type epoxy resin, a bisphenol A novolak type epoxy resin, a bisphenol F novolak type epoxy resin, an alicyclic epoxy resin, a glycidyl ester type epoxy resin, a glycidyl amine type epoxy resin, a hydantoin type epoxy resin, an isocyanurate type epoxy resin, and an aliphatic chain epoxy resin. These epoxy resins may be halogenated or hydrogenated, and may have a structure in which an acryloyl group or a methacryloyl group is added to a side chain. These epoxy resins are used singly or in combinations of two or more.

The curing agent is not particularly limited as long as the curing agent can cure the epoxy resin, and examples thereof include an anionic polymerization catalyst type curing agent, a cationic polymerization catalyst type curing agent, and a polyaddition type curing agent. The curing agent is preferable to be an anionic or cationic polymerization catalyst type curing agent from the viewpoint of excellent fast curability and no need for chemical equivalent consideration.

Examples of the anionic or cationic polymerization catalyst type curing agent may include an imidazole, a hydrazide, a boron trifluoride-amine complex, an onium salt (aromatic sulfonium salt, aromatic diazonium salt, aliphatic sulfonium salt, and the like), an amine imide, a diaminomaleonitrile, a melamine and its derivatives, a polyamine salt, a dicyandiamide, and these modified products. Examples of the polyaddition type curing agent include a polyamine, a polymercaptan, a polyphenol, and an acid anhydride.

A latent curing agent obtained by microcapsulating these curing agents with polymer substances such as polyurethanes and polyesters, metal thin films of nickel, copper, and the like, inorganic substances such as calcium silicate is preferable since the pot life can be extended. The curing agents are used singly or in combinations of two or more.

The content of the curing agent may be 0.05 to 20 parts by mass with respect to 100 parts by mass of the total amount of the thermosetting material and the thermoplastic resin added as necessary.

A radically curable adhesive contains, for example, a radical polymerizable material and a radical polymerization initiator (also referred to as a curing agent), and may further contain a thermoplastic resin, a coupling agent, a filler, and the like, as necessary.

As the radical polymerizable material, for example, any substance having a functional group which is polymerized by radical can be used without particular limitation. Specific examples of radical polymerizable materials may include an acrylate (including corresponding methacrylate, the same applies hereinafter) compound, an acryloxy (including corresponding methacryloxy, the same applies hereinafter) compound, a maleimide compound, a citraconimide resin, and a nadimide resin. These radical polymerizable substances may be in a state of a monomer or a state of an oligomer, or may be in a mixture state of a monomer and an oligomer.

Examples of an acrylate compound include methyl acrylate, ethyl acrylate, isopropyl acrylate, isobutyl acrylate, ethylene glycol diacrylate, diethylene glycol diacrylate, trimethylolpropane triacrylate, tetramethylolmethane tetraacrylate, 2-hydroxy-1,3-diacryloxypropane, 2,2-bis[4-(acryloxymethoxy)phenyl]propane, 2,2-bis[4-(acryloxypolyethoxy)phenyl]propane, dicyclopentenyl acrylate, tricyclodecanyl acrylate, tris(acryloyloxyethyl)isocyanurate, urethane acrylate, and phosphoric acid ester diacrylate.

A radical polymerizable substance such as an acrylate compound may be used together with a polymerization inhibitor such as hydroquinone and methyl ether hydroquinone as necessary. From the viewpoint of improving heat resistance, the radical polymerizable substance such as an acrylate compound preferably has at least one substituent such as a dicyclopentenyl group, a tricyclodecanyl group, and a triazine ring. As the radical polymerizable substance other than the acrylate compound, for example, the compound described in International Publication No. WO 2009/063827 can be suitably used. The radical polymerizable substances may be used singly or in combinations of two or more.

As the radical polymerization initiator, for example, any compound capable of decomposing upon heating or irradiation with light to generate radicals can be used without particular limitation. Specific examples of the radical polymerization initiator may include a peroxide compound an azo compound. These compounds are appropriately selected depending on the target connection temperature, connection time, pot life, and the like.

More specific examples of the radical polymerization initiator preferably include diacyl peroxide, peroxy dicarbonate, peroxy ester, peroxy ketal, dialkyl peroxide, hydroperoxide, and silyl peroxide. Of these initiators, peroxy ester, dialkyl peroxide, hydroperoxide, and silyl peroxide and the like are preferable, and peroxy ester is more preferable from the viewpoint of being capable of obtaining high reactivity. As these radical polymerization initiators, for example, the compound described in International Publication No. WO 2009/063827 can be suitably used. The radical polymerization initiators are used singly or in combinations of two or more.

The content of the radical polymerization initiator may be 0.1 to 10 parts by mass with respect to 100 parts by mass of the total amount of the radical polymerizable material and the thermoplastic resin added as necessary.

The thermoplastic resin which is blended as necessary in the epoxy type adhesive and the radically curable adhesive makes it easy to provide excellent film formability to the adhesive, for example. Examples of the thermoplastic resin include a phenoxy resin, a polyvinyl formal resin, a polystyrene resin, a polyvinyl butyral resin, a polyester resin, a polyamide resin, a xylene resin, a polyurethane resin, a polyester urethane resin, a phenol resin, and a terpene phenol resin. As the thermoplastic resin, for example, the compound described in International Publication No. WO 2009/063827 can be suitably used. Of the thermoplastic resins, a phenoxy resin is preferable since adhesiveness, compatibility, heat resistance, mechanical strength, and the like are excellent. The thermoplastic resins are used singly or in combinations of two or more.

The content of the thermoplastic resin may be 5 to 80 parts by mass with respect to 100 parts by mass of the total amount of the thermoplastic resin and the thermosetting material when the thermoplastic resin is added to the epoxy type adhesive. The content of the thermoplastic resin may be 5 to 80 parts by mass with respect to 100 parts by mass of the total amount of the thermoplastic resin and the radical polymerizable substance when the thermoplastic resin is added to the radically curable adhesive.

Another example of the adhesive component includes a thermal radical curable adhesive containing a thermoplastic resin, a radical polymerizable material including a radical polymerizable substance in a liquid state at 30° C., and a radical polymerization initiator. The thermal radical curable adhesive has a lower viscosity than the above adhesive component. The content of the radical polymerizable substance in the thermal radical curable adhesive is preferably 20 to 80 parts by mass, more preferably 30 to 80 parts by mass, and further preferably 40 to 80 parts by mass, with respect to 100 parts by mass of the total amount of the thermoplastic resin and the radical polymerizable substance.

The adhesive component may be an epoxy type adhesive containing a thermoplastic resin, a thermosetting material including an epoxy resin in a liquid state at 30° C., and a curing agent. In this case, the content of the epoxy resin in the epoxy type adhesive is preferably 20 to 80 parts by mass, more preferably 40 to 80 parts by mass, and further preferably 30 to 80 parts by mass, with respect to 100 parts by mass of the total amount of the thermoplastic resin and the thermosetting material.

When the adhesive film 1A is used for connecting an IC chip and a glass substrate, a flexible printed circuit (FPC), or the like, the adhesive composition preferably further comprises a component that exerts an effect of relaxing the internal stress, from the viewpoint of suppressing the warping of the substrate caused by the difference in linear expansion coefficient between the IC chip and the substrate. Specific examples of such components include an acrylic rubber and an elastomer component. Alternatively, the adhesive composition may be a radical curable adhesive as described in International Publication No. WO 98/44067.

The content of the first adhesive component 4 in the first adhesive layer 2 (the volume proportion of the first adhesive component 4 in the first adhesive layer 2) may be 75% by mass or more or 85% by volume or more, and 98% by volume or less or 92% by volume or less, based on the total volume of the first adhesive layer 2.

The content of the second adhesive component 6 in the second adhesive layer 3 (the volume proportion of the second adhesive component 6 in the second adhesive layer 3) may be 80% by mass or more or 90% by mass or more, and 98% by volume or less or 95% by volume or less, based on the total volume of the second adhesive layer 3.

The first adhesive layer 2 contains the first conductive particle 5. The first conductive particle 5 exhibits a dendritic shape (also referred to as a dendrite shape) and comprises one main shaft and a plurality of branches that two-dimensionally or three-dimensionally branch from the main shaft. The first conductive particle 5 may be formed from a metal such as copper or silver, and may be, for example, a silver-coated copper particle in which a copper particle is coated with silver.

The first conductive particle 5 may be known one, and specifically is available, for example, as ACBY-2 (Mitsui Mining & Smelting Co., Ltd.) or CE-1110 (Fukuda Metal Foil & Powder Co., Ltd.). Alternatively, the first conductive particle 5 can also be manufactured by a known method (for example, the method described in the above Patent Literature 1).

The content of the first conductive particle 5 in the first adhesive layer 2 (the volume proportion of the first conductive particle 5 in the first adhesive layer 2) may be 2% by volume or more or 8% by volume or more, and 25% by volume or less or 15% by volume or less, based on the total volume of the first adhesive layer 2.

The thickness of the first adhesive layer 2 may be, for example, 5 μm or more, 7 μm or more, or 10 μm or more, and may be 30 μm or less, 25 μm or less, or 20 μm or less.

The second adhesive layer 3 contains the second conductive particle 7 that is a conductive particle other than the first conductive particle 5. The second conductive particle 7 has a nonconductive core body and a conductive layer provided on the core body. The core body is formed from a nonconductive material such as glass, ceramic, and resin, and is preferably formed from resin. Examples of the resin include an acrylic resin, a styrene resin, a silicone resin, a polybutadiene resin, or copolymers of monomers constituting these resins. The average particle diameter of the core body may be, for example, 2 to 30 μm.

The conductive layer is formed from, for example, gold, silver, copper, nickel, palladium, or an alloy thereof. From the viewpoint of excellent conductivity, the conductive layer preferably comprises at least one selected from gold, nickel, and palladium, more preferably comprises gold or palladium, and further preferably comprises gold. The conductive layer is formed, for example, by plating the above metal on the core body. The thickness of the conductive layer may be, for example, 10 to 400 nm.

The average particle diameter of the second conductive particle 7 is preferably 30 μm or less, more preferably 25 μm or less, and further preferably 20 μm or less, from the viewpoint that the adhesive film 1A can be suitably thinned. The average particle diameter of the second conductive particle 7 may be, for example, 1 μm or more. The average particle diameter of the second conductive particle 7 is measured by a particle size distribution measuring apparatus (Microtrac (product name, Nikkiso Co., Ltd.)) using a laser diffraction-scattering method.

The content of the second conductive particle 7 in the second adhesive layer 3 (the volume proportion of the second conductive particle 7 in the second adhesive layer 3) may be 2% by volume or more or 5% by volume or more, and 20% by volume or less or 10% by volume or less, based on the total volume of the second adhesive layer 3.

The thickness of the second adhesive layer 3 may be, for example, 5 μm or more, 7 μm or more, or 10 μm or more, and may be 30 μm or less, 25 μm or less, or 20 μm or less.

In the first embodiment, the first adhesive layer 2 consists of the first conductive particle 5 as a conductive particle, and the second adhesive layer 3 consists of the second conductive particle 7 as a conductive particle, but the first adhesive layer may further contain other conductive particles such as the second conductive particle 7, and the second adhesive layer may further contain other conductive particles such as the first conductive particle 5.

When the first adhesive layer further contains the second conductive particle 7, the volume proportion of the second conductive particle 7 in the first adhesive layer is preferably smaller than the volume proportion of the second conductive particle 7 in the second adhesive layer, from the viewpoint of obtaining an adhesive film having more excellent reliability. The content of the second conductive particle 7 in the first adhesive layer may be, for example, 10% by volume or less, 5% by volume or less, or 2% by volume or less, based on the total volume of the first adhesive layer. From the same viewpoint, the first adhesive layer preferably does not contain the second conductive particle 7 as in the first embodiment.

The adhesive film 1A is obtained, for example, by separately forming the first adhesive layer 2 and the second adhesive layer 3 and then laminating them. The first adhesive layer 2 and the second adhesive layer 3 are obtained, for example, by applying a paste adhesive composition on a resin film such as a PET (polyethylene terephthalate) film and drying it. The paste adhesive composition is obtained, for example, by heating or dissolving a mixture including the adhesive components 4 and 6 and the first conductive particle 5 or the second conductive particle 7 in a solvent. As the solvent, for example, a solvent having a boiling point of 50 to 150° C. at a normal pressure is used.

The adhesive film 1A according to the first embodiment can be used as an adhesive for adhering the same types of adherend, and can also be used as an adhesive for adhering different types of adherend (for example, adherends having different thermal expansion coefficients). The adhesive film 1A is suitably used for connecting electronic members.

Figure 2:
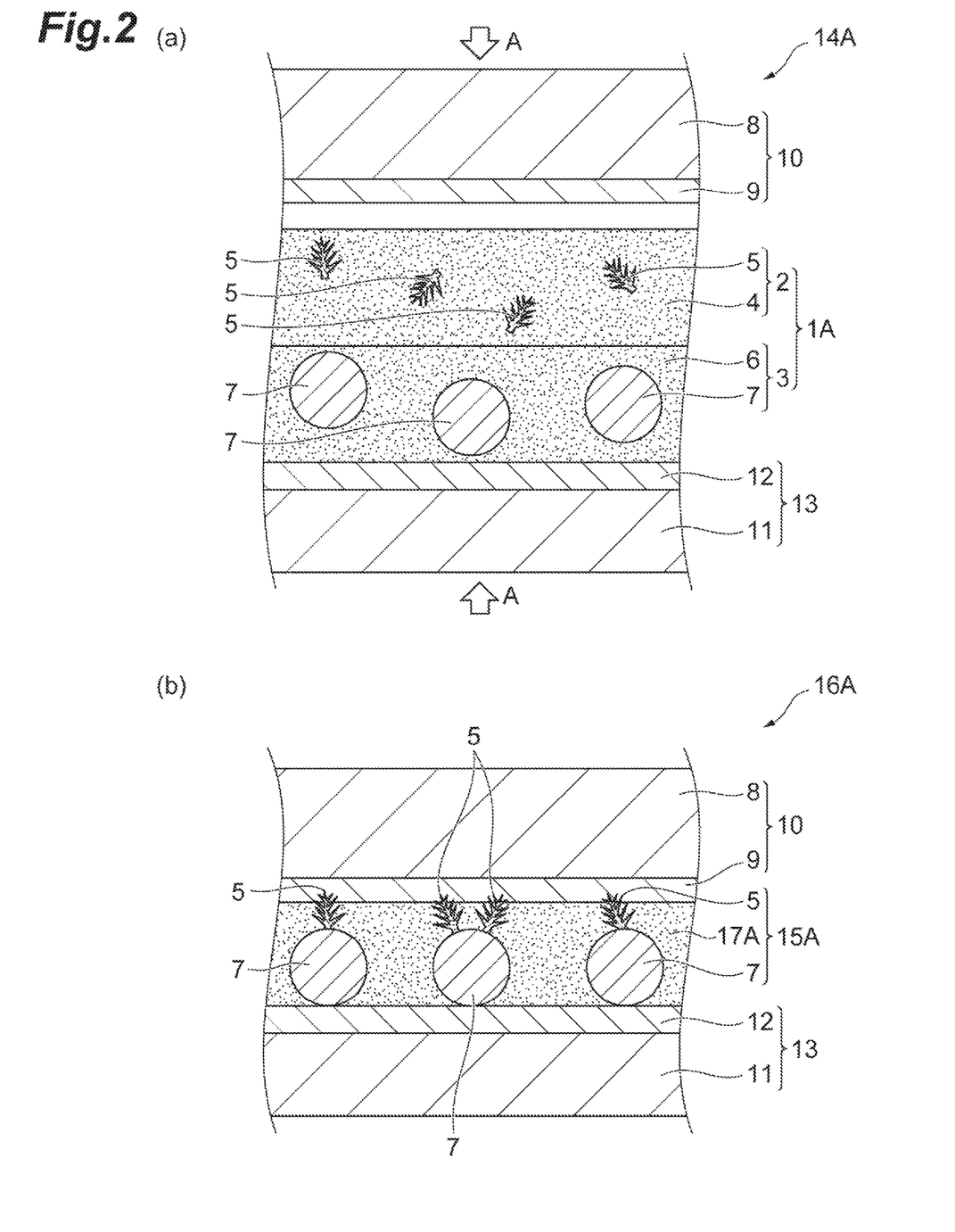
FIG. 2 is a cross-sectional diagram of a main part schematically showing an example of connection between electronic members.

FIG. 2 is a cross-sectional diagram of a main part schematically showing an example of connection between electronic members. As shown in FIG. 2(a), a laminate 14A is formed by disposing an adhesive film 1A between a first electronic member 10 comprising a first substrate 8 and a first electrode 9 formed on, for example, substantially the entire surface of the main surface of the first substrate 8, and a second electronic member 13 comprising a second substrate 11 and a second electrode 12 formed on, for example, substantially the entire surface of the main surface of the second substrate 11.

While the laminate 14A is heated, pressuring is performed in the direction indicated by arrow A in FIG. 2(a), and thereby the first electronic member 10 and the second electronic member 13 are electrically connected to each other via a circuit connecting material 15A to obtain a connection structure 16A, as shown in FIG. 2(b). The heating temperature is, for example, 50° C. to 190° C. The pressure at the pressuring is, for example, 0.1 to 30 MPa. These heating and pressurizing are performed, for example, in the range of 0.5 to 120 seconds.

Each of the first substrate 8 and the second substrate 11 may be a substrate formed from glass, ceramic, polyimide, polycarbonate, polyester, polyethersulfone, or the like. Each of the first electrode 9 and the second electrode 12 may be an electrode formed from gold, silver, copper, tin, aluminum, ruthenium, rhodium, palladium, osmium, iridium, platinum, indium tin oxide (ITO), or the like.

The circuit connecting material 15A includes the first conductive particle 5, the second conductive particle 7, and a cured product 17A of the adhesive components 4 and 6. That is, the circuit connecting material 15 is obtained by curing the above adhesive film 1A.

In the adhesive film 1A according to the first embodiment, it is possible to suitably connect the electronic members 10 and 13, even when the first electrode 9 is formed from a material (for example, copper, aluminum) which easily forms an oxide film on the surface thereof. This is considered to be caused by the fact that the first conductive particle 5 and the second conductive particle 7 are used in combination in the adhesive film 1A. It is considered that as shown in FIG. 2(b), while the second conductive particle 7 forms a main conduction path for electrically connecting the first electrode 9 and the second electrode 12, the first conductive particle 5 assist the electrical connection between the second conductive particle 7 and the first electrode 9, thereby realizing a suitable connection.

The present inventor has assumed that more specifically, even when an oxide film is formed on the surface of the first electrode 9, the first conductive particle 5 is a dendritic conductive particle and hence the first conductive particle 5 can penetrate through the oxide film and be in contact with the first electrode 9, allowing to provide suitable connection between the second conductive particle 7 and the first electrode 9. Therefore, the adhesive film 1A according to the first embodiment is assumed to have excellent reliability, that is, to be capable of maintaining desired conductivity against a change in ambient temperature, with compared to an adhesive film using only one of the first conductive particle and the second conductive particle.

Furthermore, the adhesive film 1A according to the first embodiment comprises the first adhesive layer 2 containing the first conductive particle 5 and the second adhesive layer 3 containing the second conductive particle 7, allowing to more preferably connect the electronic members 10 and 13 each other. Specifically, when the electronic members 10 and 13 are connected each other, the first adhesive layer 2 containing the first conductive particle 5 is adhered to the first electrode 9 in the first electronic member 10, and thereby the first conductive particle 5 in the first adhesive layer 2 is in contact with the first electrode 9 and in this state, the second conductive particle 7 in the second adhesive layer 3 is in contact with the first conductive particle 5. As a result, even when an oxide film is formed on the surface of the first electrode 9, the first conductive particle 5 is assumed to be allowed to be contact with the first electrode 9 more firmly and to achieve more stable connection.

Therefore, according to the adhesive film 1A according to the first embodiment, reliability is assumed to be more improved, for example, with compared to an adhesive film consisting of one layer containing both the first conductive particle 5 and the second conductive particle 7. According to the adhesive film 1A according to the first embodiment, the content of the first conductive particle 5 can also be reduced while ensuring suitable connection between the electronic members 10 and 13, for example, with compared to the adhesive film consisting of one layer containing both the first conductive particle 5 and the second conductive particle 7.

Figure 3:
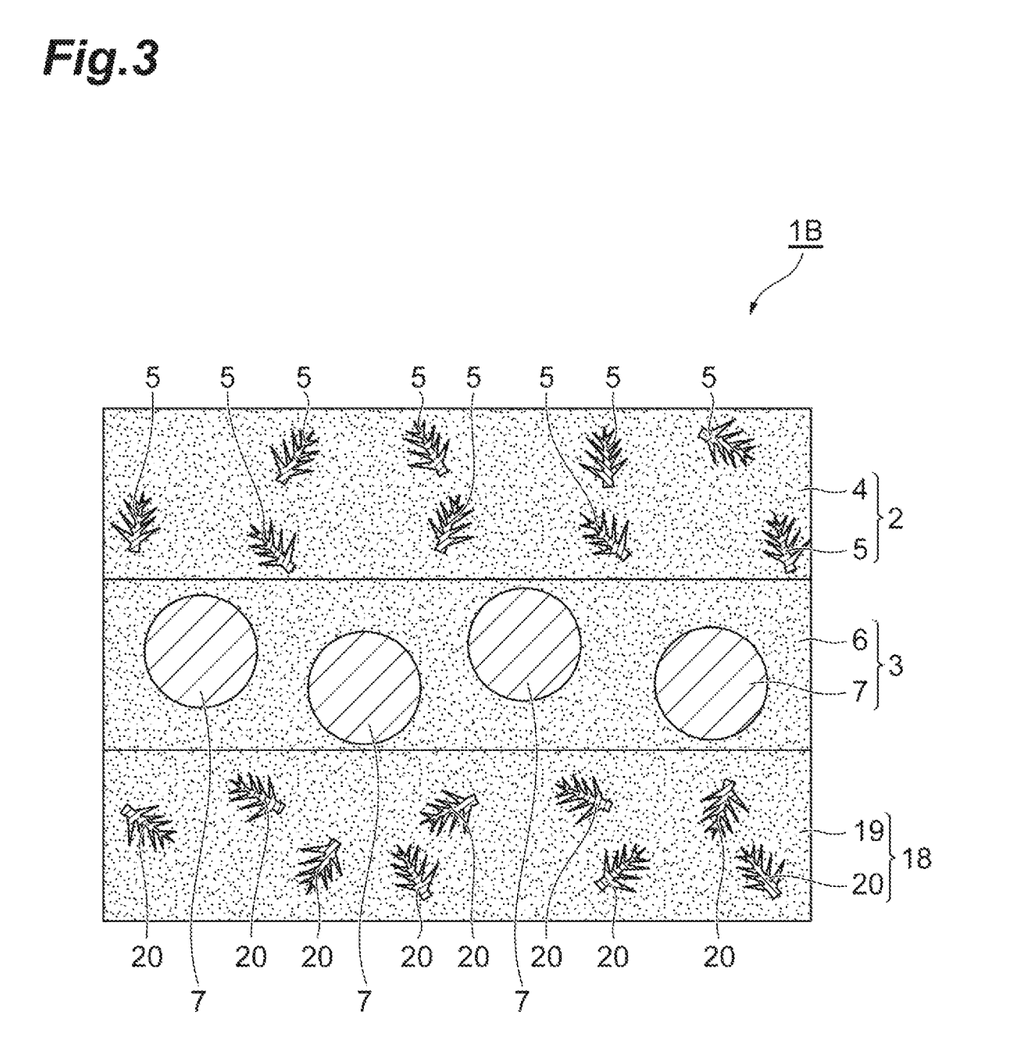
FIG. 3 is a schematic cross-sectional diagram showing another one embodiment of the adhesive film.

The adhesive film may further comprise a third adhesive layer in another embodiment. FIG. 3 is a schematic cross-sectional diagram showing another embodiment (the second embodiment) of the adhesive film. As shown in FIG. 3, the adhesive film 1B according to the second embodiment comprises the first adhesive layer 2, the second adhesive layer 3, and the third adhesive layer 18 in this order. The first adhesive layer 2 contains a first adhesive component 4 and a first conductive particle 5 dispersed in the first adhesive component 4. The second adhesive layer 3 contains a second adhesive component 6 and a second conductive particle 7 dispersed in the second adhesive component 6. The third adhesive layer 18 contains a third adhesive component 19 and a third conductive particle 20 dispersed in the third adhesive component 19.

The first adhesive component 4, the second adhesive component 6, and the third adhesive component 19 may be the same or different from each other, and preferably are the same, from the viewpoint of obtaining stable adhesive strength against a change in ambient temperature. The third adhesive component 19 may be the above adhesive component.

The content of the third adhesive component 19 in the third adhesive layer 18 (the volume proportion of the third adhesive component 19 in the third adhesive layer 18) may be 75% by volume or more or 85% by volume or more, and 98% by volume or less or 92% by volume or less, based on the total volume of the third adhesive layer 18.

The third adhesive layer 18 contains a third conductive particle 20 that is a dendritic conductive particle. The detail of the third conductive particle 20 is the same as that of the above first conductive particle 5, and the overlapping description will be omitted. The third conductive particle 20 may be the same as or different from the first conductive particle 5, and is preferably the same, from the viewpoint of obtaining stable adhesive strength against a change in ambient temperature.

The content of the third conductive particle 20 in the third adhesive layer 18 (the volume proportion of the third conductive particle 20 in the third adhesive layer 18) may be 2% by volume or more or 8% by volume or more, and may be 25% by volume or less or 15% by volume or less, based on the total volume of the third adhesive layer 18.

The thickness of the third adhesive layer 18 may be, for example, 5 μm or more, 7 μm or more, or 10 μm or more, and may be 30 μm or less, 25 μm or less, or 20 μm or less.

In the second embodiment, the third adhesive layer 18 consists of the third conductive particle 20 as the conductive particle, but the third adhesive layer may further contain other conductive particles such as the second conductive particle 7.

When the third adhesive layer further contains the second conductive particle 7, the volume proportion of the second conductive particle 7 in the third adhesive layer is preferably smaller than the volume proportion of the second conductive particle 7 in the second adhesive layer, from the viewpoint of obtaining an adhesive film having more excellent reliability. The content of the second conductive particle 7 in the third adhesive layer may be, for example, 10% by volume or less, 5% by volume or less, or 2% by volume or less, based on the total volume of the third adhesive layer. From the same viewpoint, the third adhesive layer preferably does not contain the second conductive particle 7 as in the second embodiment.

The adhesive film 1B according to the second embodiment is obtained, for example, by separately forming each of the first adhesive layer 2, the second adhesive layer 3, and the third adhesive layer 18 and then laminating them. The third adhesive layer 18 is obtained by the same method as the method of forming the above first adhesive layer 2 and the above second adhesive layer 3.

The adhesive film 1B according to the second embodiment can also be used as an adhesive for adhering the same types of adherend as well as an adhesive for adhering different types of adherend (for example, adherends having different thermal expansion coefficients), and can also be suitably used for the connection of electronic members.

Figure 4:
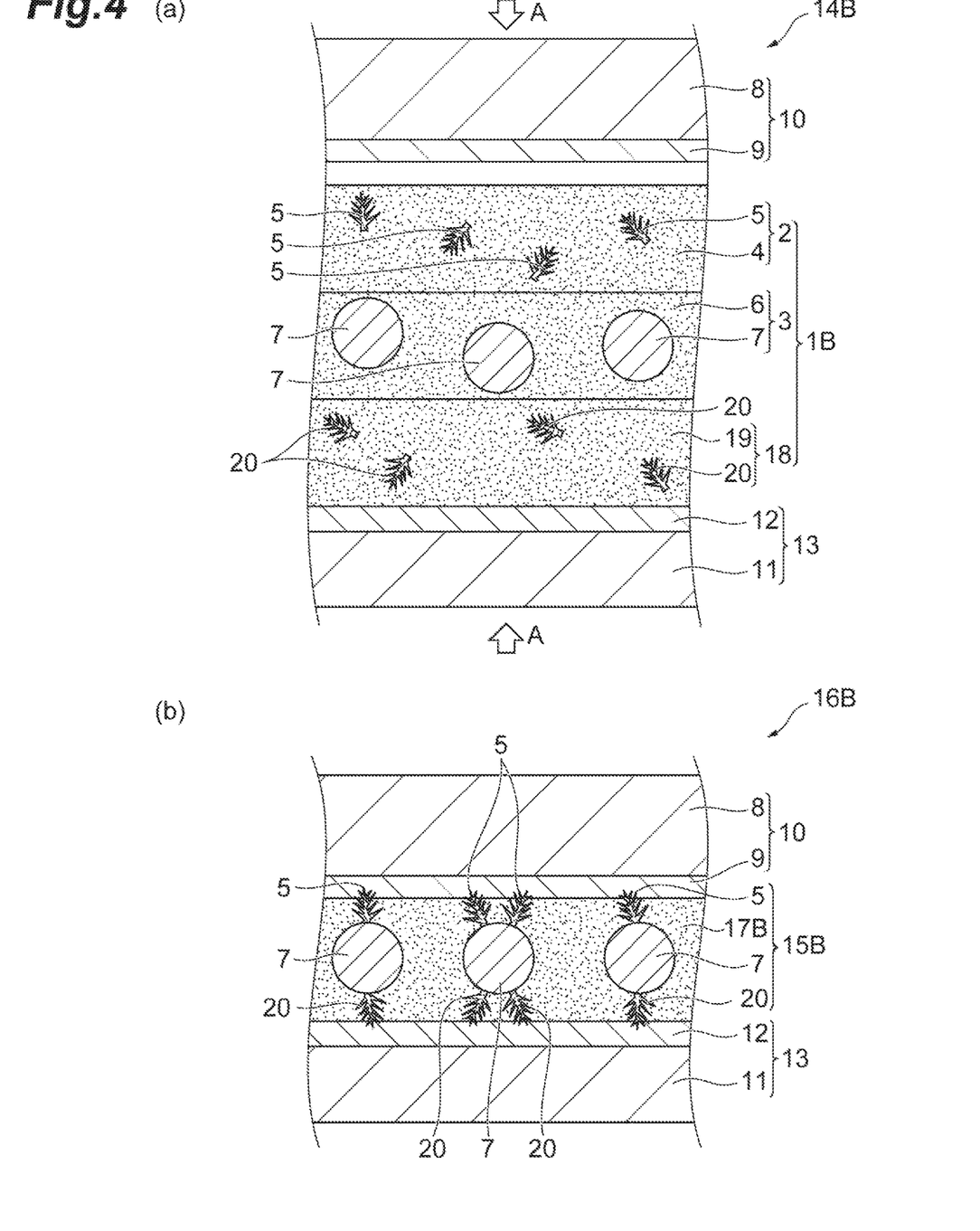
FIG. 4 is a cross-sectional diagram of a main part schematically showing another example of connection between electronic members.

FIG. 4 is a cross-sectional diagram of a main part schematically showing another example of the connection of the electronic members. Hereinafter, the description overlapping with the example of the connection of the electronic members shown in FIG. 2 will be omitted. In this example, as shown in FIG. 4(a), the adhesive film 1B according to the second embodiment is disposed between the first electronic member 10 and the second electronic member 13 to form a laminate 14B.

As described above, pressuring is performed in the direction indicated by arrow A in FIG. 4(a) while the laminate 14B is heated, and thereby the first electronic member 10 and the second electronic member 13 are electrically connected to each other via a circuit connecting material 15B to obtain a connection structure 16B, as shown in FIG. 4(b). The circuit connecting material 15B includes the first conductive particle 5, the second conductive particle 7, the third conductive particle 20, and the cured product 17B of an adhesive component. That is, the circuit connecting material 15B is formed by curing the above adhesive film 1B.

In the adhesive film 1B according to the second embodiment, it is possible to suitably connect the electronic members 10 and 13, even when the second electrode 12 is formed from a material (for example, copper and aluminum) that easily forms an oxide film on its surface, in addition to the first electrode 9. This is because the third conductive particle 20 is a dendritic conductive particle and thereby the third conductive particle 20 can penetrate the oxide film and contact the second electrode 12 even when the oxide film is formed on the surface of the second electrode 12. Therefore, the adhesive film 1B according to the second embodiment is assumed to have excellent reliability, that is to be capable of maintaining desired conductivity against a change in ambient temperature, with compared to the adhesive film using only one of the first conductive particle and the second conductive particle.

The adhesive film 1B according to the second embodiment comprises the first adhesive layer 2 containing the first conductive particle 5, the second adhesive layer 3 containing the second conductive particle 7, and the third adhesive layer 18 containing the third conductive particle 20 in this order, allowing to more suitably connect the electronic members 10 and 13 together. Specifically, in the case where an oxide film is formed on the surface of the second electrode 12 in addition to the first electrode 9, when the electronic members 10 and 13 are connected together, the first conductive particle 5 in the first adhesive layer 2 can contact with the first electrode 9 more preferentially than the second conductive particle 7 in the second adhesive layer 3, and the third conductive particle 20 in the third adhesive layer 18 can contact with the second electrode 12 more preferentially than the second conductive particle 7 in the second adhesive layer 3.

Therefore, according to the adhesive film 1B according to the second embodiment, reliability is assumed to be more improved, for example, with compared to an adhesive film consisting of one layer containing the first conductive particle 5 (the third conductive particle 20) and the second conductive particle 7. According to the adhesive film 1B according to the second embodiment, the content of the first conductive particle 5 (the third conductive particle 20) can also be reduced while ensuring suitable connection between the electronic members 10 and 13, for example, with compared to the adhesive film consisting of one layer containing the first conductive particle 5 (the third conductive particle 20) and the second conductive particle 7.

EXAMPLES

Hereinafter, the present invention will be described more specifically based on Examples, but the present invention is not limited to the following Examples.

(Preparation of Solution A1)

50 g of a phenoxy resin (product name: PKHC, weight average molecular weight: 45000, manufactured by Union Carbide Corporation) was dissolved in a mixed solvent of toluene (boiling point: 110.6° C.) and ethyl acetate (boiling point: 77.1° C.) (at a mass ratio of toluene:ethyl acetate=1:1) to obtain a phenoxy resin solution having a solid content of 40% by mass. In this phenoxy resin solution, urethane acrylate (product name: UN7700, manufactured by Negami Chemical Industrial Co., Ltd.) and phosphoric acid ester dimethacrylate (product name: Light Ester P-2M, manufactured by Kyoeisha Chemical Co., Ltd.) as a radical polymerizable substance, and 1,1-bis(t-hexylperoxy)-3,3,5-trimethylcyclohexane (product name: Perhexa TMH, manufactured by NOF Corporation) as a curing agent were blended at a solid mass ratio of phenoxy resin:urethane acrylate:phosphoric acid ester dimethacrylate:curing agent=10:10:3:2 to obtain a solution A1.

The dendritic conductive particles (silver-coated copper particles, manufactured by Mitsui Mining & Smelting Co., Ltd., product name: ACBY-2) were used as conductive particles B1 (the first conductive particles).

(Preparation of Core Bodies (Resin Particles))

Benzoyl peroxide as a polymerization initiator was added to a mixed solution of divinylbenzene, styrene monomer, and butyl methacrylate, and polymerization reaction was performed by heating at high speed with uniform stirring to obtain a fine particle dispersion solution. This fine particles dispersion solution was filtered and dried under reduced pressure to obtain a block body which was an aggregate of fine particles. This block body was pulverized to prepare core bodies (resin particles) having an average particle diameter of 20 μm and different crosslinking density.

(Preparation of conductive particles C1)

A palladium catalyst (product name: MK-2605, manufactured by Muromachi Technos Co., Ltd.) was supported on the surface of the above core bodies, and the core bodies were activated with an accelerator (product name: MK-370, manufactured by Muromachi Technos Co., Ltd.). The core body was added to a mixed solution of nickel sulfate aqueous solution, sodium hypophosphite aqueous solution, and sodium tartrate aqueous solution heated to 60° C. to perform a pre-electroless plating step. The mixture was stirred for 20 minutes, and it was confirmed that hydrogen bubbling stopped. A mixed solution of nickel sulfate, sodium hypophosphite, sodium citrate, and a plating stabilizer was added and stirred until pH was stabilized, and the post-electroless plating step was performed until hydrogen bubbling stopped. Subsequently, the plating solution was filtered, the filtrate was washed with water, and then dried with a vacuum dryer at 80° C. to prepare a nickel-plated conductive particles C1 (the second conductive particles).

Example 1

<Film Formation of Adhesive Film>

45 parts by volume of the conductive particle B1 were dispersed in 100 parts by volume of the solution A1 to obtain a mixed solution. The obtained mixed solution was applied on a fluororesin film with a thickness of 80 μm and dried with hot air at 70° C. for 10 minutes to remove the solvent to obtain a filmy adhesive composition (first adhesive layer) with a thickness of 10 μm formed on the fluororesin film.

5 parts by volume of the conductive particle C1 was dispersed in 100 parts by volume of the solution A1 to obtain a mixed solution. The obtained mixed solution was applied on a fluororesin film with a thickness of 80 μm and dried with hot air at 70° C. for 10 minutes to remove the solvent to obtain a filmy adhesive composition (the second adhesive layer) with a thickness of 20 μm formed on the fluororesin film. The first adhesive layer was laminated on the second adhesive layer, and the fluororesin film was peeled off to obtain an adhesive film with a thickness of 30 μm.

Example 2

The first adhesive layer and the second adhesive layer were prepared in the same manner as in Example 1. As the third adhesive layer, the same adhesive layer as the first adhesive layer was prepared. In the same manner as in Example 1, the first adhesive layer was laminated to the second adhesive layer, the fluororesin film on the second adhesive layer was removed, the third adhesive layer was laminated on the surface of the second adhesive layer opposite to the first adhesive layer, and the fluororesin film was peeled off to obtain an adhesive film with a thickness of 40 μm.

Comparative Example 1

15 parts by volume of the conductive particle C1 was dispersed in 100 parts by volume of the solution A1 to obtain a mixed solution. The obtained mixed solution was applied on a fluororesin film with a thickness of 80 μm and dried with hot air at 70° C. for 10 minutes to remove the solvent to obtain a filmy adhesive composition with a thickness of 40 μm formed on the fluororesin film.

Comparative Example 2

30 parts by volume of the conductive particle C1 was dispersed in 100 parts by volume of the solution A1 to obtain a mixed solution. The obtained mixed solution was applied on a fluororesin film with a thickness of 80 μm and dried with hot air at 70° C. for 10 minutes to remove the solvent to obtain a filmy adhesive composition with a thickness of 40 μm formed on the fluororesin film.

Referential Example 1

45 parts by volume of the conductive particle B1 and 15 parts by volume of the conductive particle C1 were dispersed in 100 parts by volume of the solution A1 to obtain a mixed solution. The obtained mixed solution was applied on a fluororesin film with a thickness of 80 μm and dried with hot air at 70° C. for 10 minutes to remove the solvent to obtain a filmy adhesive composition with a thickness of 30 μm formed on the fluororesin film.

The reliability of using each adhesive film (filmy adhesive composition) obtained in Examples, Comparative Examples, and Referential Example as a circuit connecting material was evaluated by the following reliability test. The results are shown in Tables 1 and 2.

<Reliability Test>

Figure 5:
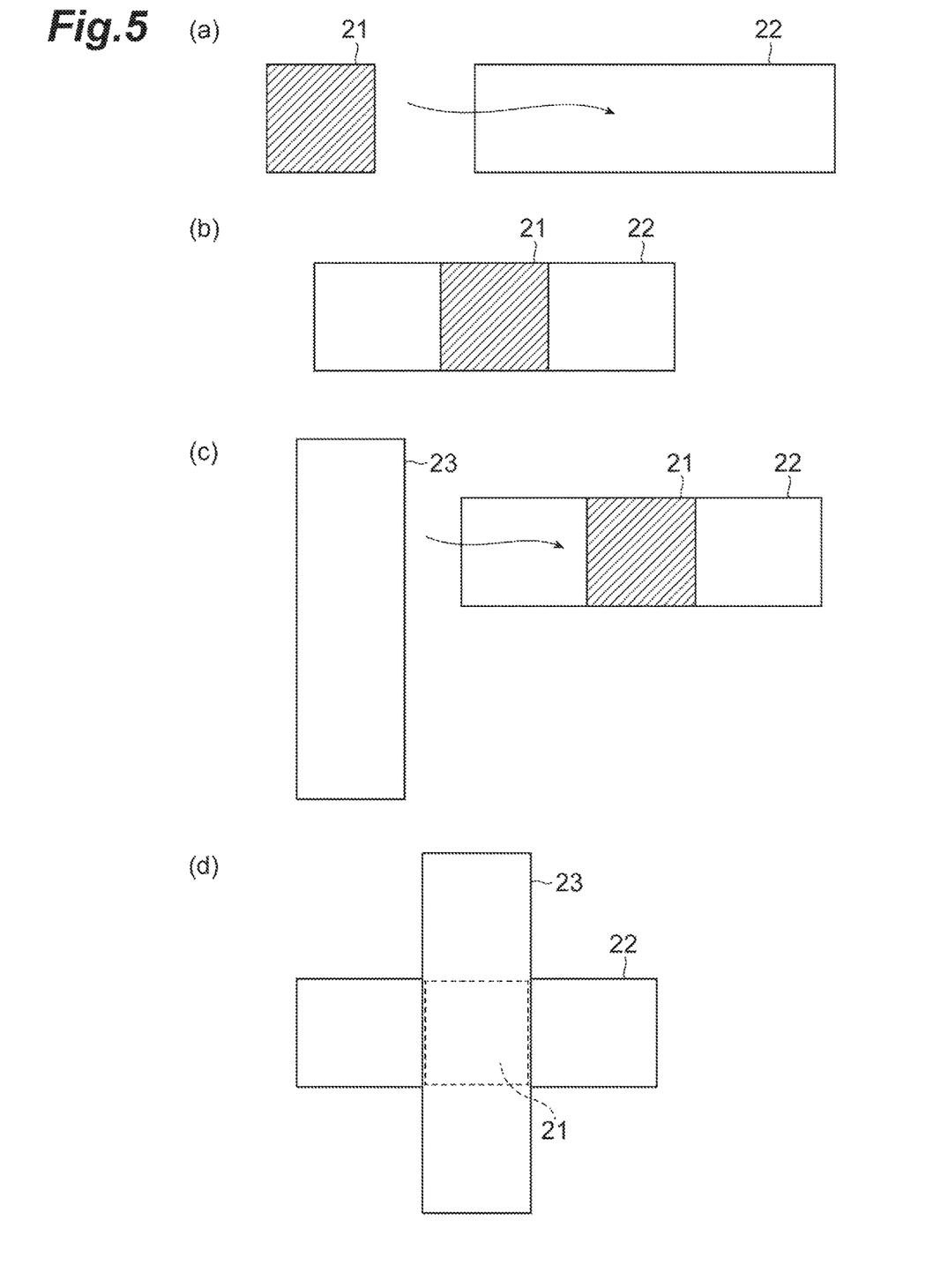
FIG. 5 is a schematic diagram showing a method for preparing a mount set for a reliability test.

As shown in FIGS. 5(a) and 5(b), the adhesive film 21 obtained by cutting out into 6 mm×6 mm was placed approximately at the center of the copper foil 22 of 6 mm×50 mm and was attached by heating and pressuring with BD-07 manufactured by Ohashi Engineering Co., Ltd. (50° C., 0.5 MPa, 2 seconds). Subsequently, as shown in FIGS. 5(c) and 5(d), the aluminum foil 23 of 50 mm×6 mm was provided and placed on the laminate of the copper foil 22 and the adhesive film 21 in such a way as to cover the adhesive film 21, heating and pressuring was performed with BD-07 manufactured by Ohashi Engineering Co., Ltd. (150° C., 0.5 MPa, 10 seconds) to obtain a mount set for reliability test.

Figure 6:
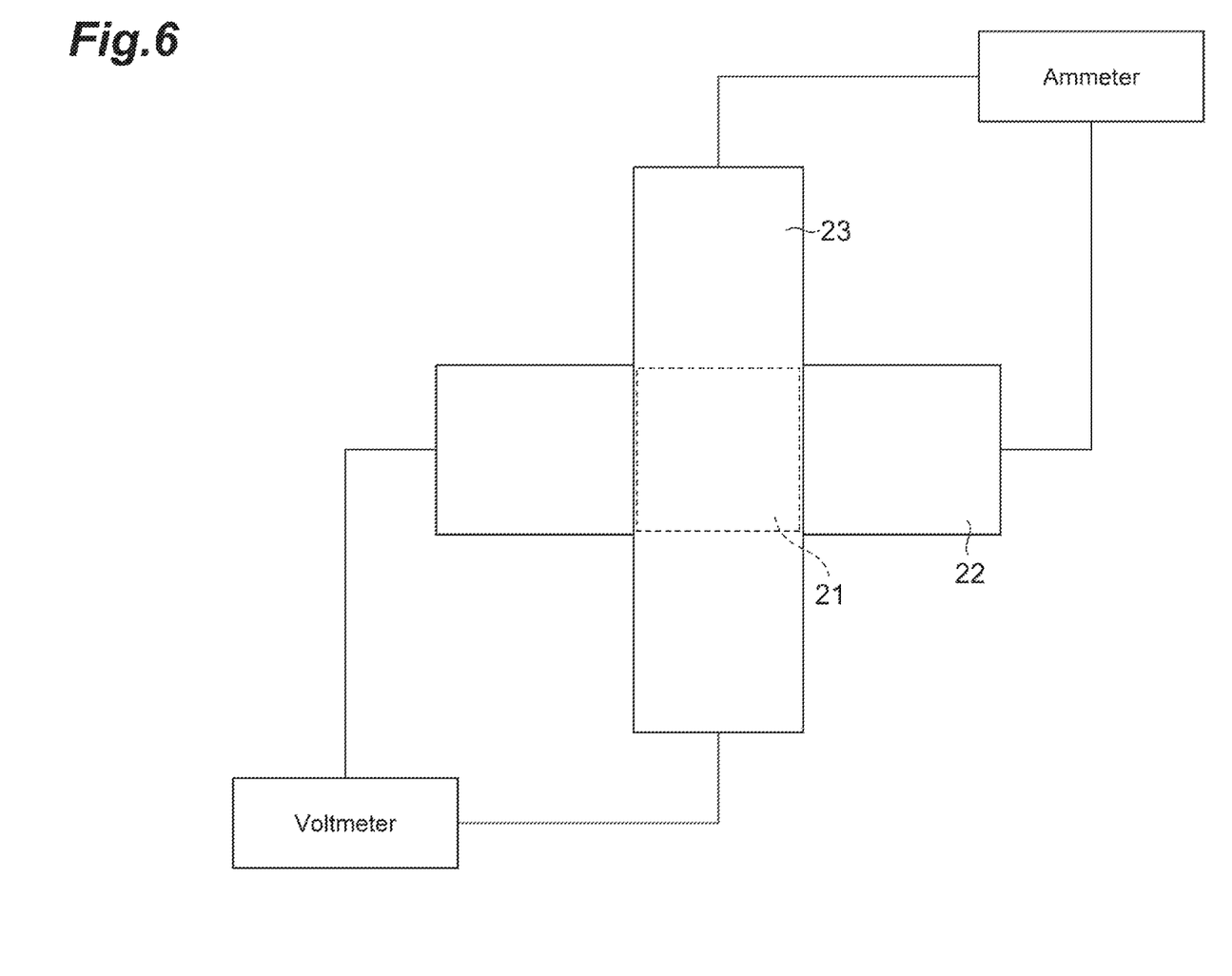
FIG. 6 is a schematic diagram showing a method for measuring connection resistance in a reliability test.

As shown in FIG. 6, an ammeter and a voltmeter were connected to the obtained mount set, and connection resistance (initial) was measured by a four-terminal method. Using a TSA-43EL manufactured by Espec Corporation, the mount set was subjected to a heat cycle test by repeating 500 cycles of a heat cycle of holding at −20° C. for 30 minutes, raising the temperature to 100° C. in 10 minutes, holding at 100° C. for 30 minutes, and cooling to −20° C. in 10 minutes, and then the connection resistance (after the heat cycle test) was measured in the same manner as above.

TABLE 1

|  |  | Example 1 | | Example 2 | | |
| --- | --- | --- | --- | --- | --- | --- |
|  |  | First adhesive layer | Second adhesive layer | First adhesive layer | Second adhesive layer | Third adhesive layer |
| Composition (parts by volume) | Solution A1 | 100 | 100 | 100 | 100 | 100 |
|  | Conductive particle B1 | 45 | — | 45 | — | 45 |
|  | Conductive particle C1 | — | 15 | — | 15 | — |
| Reliability test (connection resistance/Ω) | Initial | 0.05 | | 0.06 | | |
|  | After heat cycle test | 0.11 | | 0.12 | | |

TABLE 2

|  |  | Comparative Example 1 | Comparative Example 2 | Referential Example 1 |
| --- | --- | --- | --- | --- |
|  |  | Only one layer in any Example | | |
| Composition (parts by volume) | Solution A1 | 100 | 100 | 100 |
|  | Conductive particle B1 | — | — | 45 |
|  | Conductive particle C1 | 15 | 30 | 15 |
| Reliability test (connection resistance/Ω) | Initial | 0.16 | 0.14 | 0.11 |
|  | After heat cycle test | 3.87 | 3.26 | 0.42 |

REFERENCE SIGNS LIST 1A and 1B: adhesive film, 2: first adhesive layer, 3: second adhesive layer, 5: first conductive particle, 7: second conductive particle, 18: third adhesive layer, 20: third conductive particle.

The invention claimed is:

1. An adhesive film comprising:
a first adhesive layer comprising a first adhesive component and a first conductive particle that is a dendritic conductive particle, wherein the first adhesive component contains a material exhibiting curability by heat or light and a thermoplastic resin, and wherein the thermoplastic resin includes a phenoxy resin, a polyvinyl formal resin, a polystyrene resin, a polyvinyl butyral resin, a polyester resin, a polyamide resin, a xylene resin, a polyurethane resin, a polyester urethane resin, a phenol resin, or a terpene phenol resin; and
a second adhesive layer comprising a second conductive particle that is a conductive particle other than the first conductive particle, the second conductive particle comprising a nonconductive core body and a conductive layer provided on the core body.

2. The adhesive film according to claim 1, wherein the first adhesive layer further comprises the second conductive particle, and
a volume proportion of the second conductive particle in the first adhesive layer is smaller than a volume proportion of the second conductive particle in the second adhesive layer.

3. The adhesive film according to claim 1, wherein the first adhesive layer does not comprise the second conductive particle.

4. The adhesive film according to claim 1, wherein the conductive layer comprises at least one selected from the group consisting of gold, nickel, and palladium.

5. The adhesive film according to claim 1, wherein the conductive layer comprises at least one selected from the group consisting of nickel and palladium.

6. The adhesive film according to claim 1, wherein the second adhesive layer includes a second adhesive component containing a material exhibiting curability by heat or light and a thermoplastic resin, and
wherein the thermoplastic resin includes a phenoxy resin, a polyvinyl formal resin, a polystyrene resin, a polyvinyl butyral resin, a polyester resin, a polyamide resin, a xylene resin, a polyurethane resin, a polyester urethane resin, a phenol resin, or a terpene phenol resin.

7. The adhesive film according to claim 6, wherein the thermoplastic resin contained in the first adhesive component includes the phenoxy resin.

8. The adhesive film according to claim 1, wherein the thermoplastic resin contained in the second adhesive component includes the phenoxy resin.

9. An adhesive film comprising:
a first adhesive layer comprising a first conductive particle that is a dendritic conductive particle;
a second adhesive layer comprising a second conductive particle that is a conductive particle other than the first conductive particle, the second conductive particle comprising a nonconductive core body and a conductive layer provided on the core body; and
a third adhesive layer including a third conductive particle that is a dendritic conductive particle, wherein
the adhesive film comprises the first adhesive layer, the second adhesive layer, and a third adhesive layer in this order.

10. The adhesive film according to claim 9, wherein
the third adhesive layer further comprises the second conductive particle, and
a volume proportion of the second conductive particle in the third adhesive layer is smaller than a volume proportion of the second conductive particle in the second adhesive layer.

11. The adhesive film according to claim 9, wherein the third adhesive layer does not comprise the second conductive particle.

* * * * *